Sept. 5, 1950 E. M. KURTZ ET AL 2,521,585
TOOLHOLDER FOR DRILL PRESSES AND THE LIKE
Filed Oct. 18, 1948
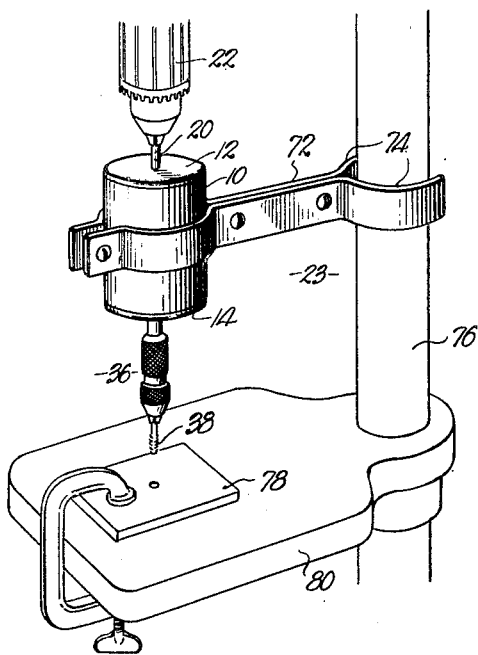
Fig. 1.
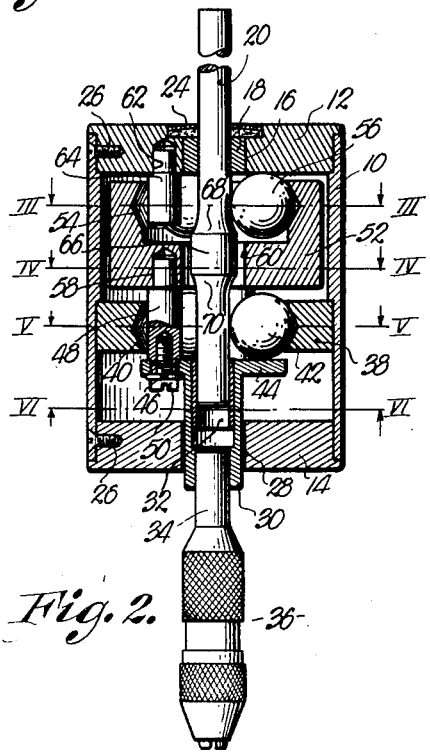
Fig. 2.
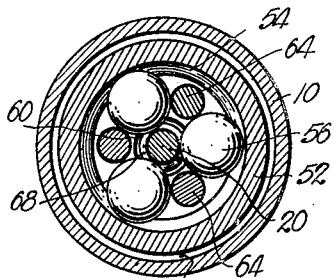
Fig. 3.
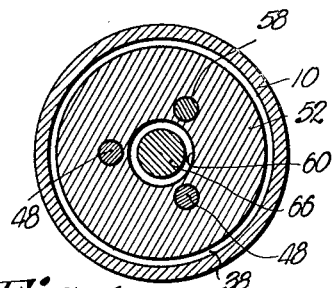
Fig. 4.
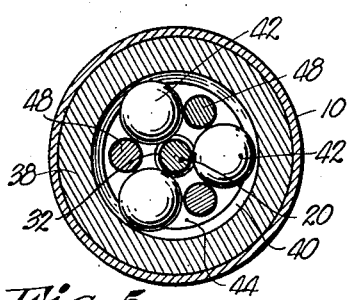
Fig. 5.
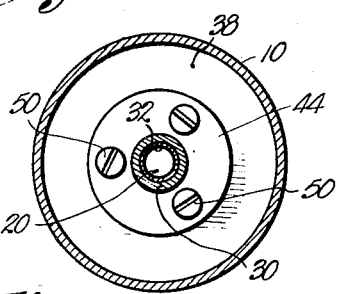
Fig. 6.
INVENTORS.
Earl M. Kurtz
Joseph B. Houston
BY
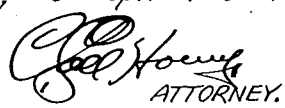
ATTORNEY.

Patented Sept. 5, 1950

2,521,585

UNITED STATES PATENT OFFICE 2,521,585

TOOLHOLDER FOR DRILL PRESSES AND THE LIKE

Earl M. Kurtz and Joseph B. Houston, Kansas City, Mo.

Application October 18, 1948, Serial No. 55,042

5 Claims. (Cl. 74—750)

1

This invention relates to machinist's tools and more particularly to an instrumentality forming a driving connection between a pair of rotatable shafts, the primary object being to provide means for transmitting rotative motion to a driven shaft in either of two directions while the drive shaft rotates in a single direction, all to the end that the speed of rotation of the driven shaft can be varied and, further to the end that a positive drive is eliminated, thereby eliminating breakage of parts connected to and worked upon through the driven shaft.

The most important object of this invention is to provide a device capable of being interposed between a drive shaft, such as a shank extending from a drill press or lathe chuck, and a driven shaft having a second chuck thereon for receiving a tap or analogous tool, the device being shiftable as a unit longitudinally relative to the axes of rotation of the shafts for moving parts thereof to and from frictional engagement with the drive shaft, whereby to rotate the driven shaft in either of two directions.

Another important object of this invention is to provide a rotatable drive shaft having a boss intermediate the ends thereof and a plurality of rotatable members circumscribing the drive shaft and having driving connection with the driven shaft, all to the end that, as the rotatable elements are brought into frictional engagement with said boss, the driven shaft is actuated thereby.

A further object of this invention is to provide a device of the aforementioned character having a second set of rotatable elements circumscribing the drive shaft on the opposite side of the boss thereof, said second set of elements also having driving connection with the driven shaft, to the end that the latter may be rotated in the opposite direction upon proper relative reciprocation of the drive shaft and the entire device as a unit.

A still further object of this invention is to provide a hollow body having a pair of annular races formed therein, one of the races being integral with the body, the other being rotatable relative thereto, said races having rotatable elements carried thereby for operating the driven shaft through frictional engagement between the rotatable elements and the drive shaft either through a revolving action of one set of rotatable elements or upon rotation of one of the members having a race formed therein with respect to the body.

Other more minor objects will be made clear

2 as the following specification progresses, reference being had to the accompanying drawing, wherein:

Fig. 1 is a perspective view of a tool holder for drill presses and the like made in accordance with our present invention, showing one operative use thereof.

Fig. 2 is an enlarged, substantially central, longitudinal, cross sectional view taken on line II—II of Fig. 1.

Fig. 3 is a transverse, cross sectional view taken on line III—III of Fig. 2.

Fig. 4 is a transverse, cross sectional view taken on line IV—IV of Fig. 2.

Fig. 5 is a transverse, cross sectional view taken on line V—V of Fig. 2; and,

Fig. 6 is a transverse, cross sectional view taken on line VI—VI of Fig. 2, looking in the direction of the arrows.

The device about to be described has been produced primarily to overcome present-day difficulties experienced by machinists in tapping operations. Breakage of taps and damage to the work itself is quite common, particularly when relatively small taps are being used, because of the fact that the drill press or other instrumentality used to rotate the tap imparts a positive drive to the tool and the operator is unable to determine when too much pressure is being applied. Consequently, for the most part, whenever a small tapping operation is to take place, the same is conducted by hand. Obviously, this method of tapping small pieces of work is slow, tedious and somewhat difficult.

It will become apparent that the instrumentality forming the subject matter hereof will eliminate all of the aforesaid difficulties and permit a tapping operation through use of the conventional drill press or like mechanism, irrespective of the relative small size of the tap. Inasmuch as the driving connection forming the subject matter hereof can be controlled by the operator and is purely frictional, any binding that might occur between the tap or other tool and the work itself will immediately cause a cessation of tap rotation and thereby eliminate breakage and other damage.

In the drawing, there is illustrated an elongated tubular body 10 having both ends thereof initially open, said ends being closed by a pair of opposed plugs 12 and 14, respectively. The plug 12 is provided with a central opening 16 for receiving a bushing 18 that, in turn, rotatably and slidably receives an elongated shaft 20.

The uppermost end of shaft 20 is received by a chuck 22 or other releasable joining structure forming a part of a conventional drill press 23, lathe or other machine capable of imparting rotative movement to the shaft 20. Obviously, the chuck 22, as well as the driving connection therefor, forms no part of this invention.

The outermost end of the opening 16 within plug 12 is enlarged, as indicated in Fig. 2 of the drawing, for receiving a suitable washer 24 formed from material capable of maintaining shaft 20 properly lubricated within bushing 18 and, at the same time, prevent entrance of dust and other foreign particles into body 10. Both of the plugs 12 and 14 are removably held secured within body 10 through the medium of a plurality of screws or the like 26.

The plug 14 is, likewise, provided with a central opening 28 for rotatably receiving a tubular member 30, which, in turn, receives a tubular bushing 32. A loose fit is provided for member 30 in opening 28, to the end that shaft 20 becomes self-centering in body 10, thereby eliminating binding. A stub shaft 34 is secured to the member 30 by press fit or other means and extends outwardly from the outermost end thereof for receiving a chuck 36. The relatively small chuck 36 may be fastened to the outermost end of stub shaft 34 in any suitable manner and is of conventional character for receiving a tap 38 or other machinist's tool to be rotated by rotation of shaft 34 and, consequently, chuck 36.

A ring-like member 38 is rigidly secured within body 10 intermediate the ends thereof and is provided with an annular race 40 that circumscribes the drive shaft 20 adjacent the innermost end thereof, said race 40 receiving a plurality of rotatable elements 42 which, in the instance shown, constitute spherical members. There are three of the spherical members 42 disposed within the race 40, as indicated in Fig. 5 of the drawing, but the number thereof is immaterial to this invention.

Fig. 4, also, illustrates the way in which these rotatable elements 42 are disposed between the race 40 and the shaft 20 in relatively close relationship thereto but provided with sufficient clearance to permit free rotation of shaft 20 with respect to the elements 42.

The rotatable, tubular member 30 is provided with an out-turned flange 44 at the innermost end thereof, said flange being disposed between the race member 38 and the plug 14. This flange 44 is provided with a number of openings 46 for receiving a lowermost end of a stub 48 that is held in place by a screw or the like 50.

There are three of these stubs 48 and, consequently, three openings 46 and screws 50 within the flange 44, as indicated in Fig. 5 of the drawing, said stubs 48 extending outwardly from the flange 44 between the rotatable elements 42. These stubs 48, accordingly, serve to separate the elements 42 and project beyond that face of the race member 38 opposite to flange 44.

Fig. 2 of the drawing, also, illustrates the way in which the flange 44 of rotatable member 30 cooperates with the shaft 20 and the race member 38 in holding the rotatable elements 42 against displacement in one direction with respect to body 10. It is to be understood that the three stubs 48 carried by flange 44 are free to rotate with the member 30 within the race 40 and about or with the shaft 20.

The outermost free ends of the stubs 48, opposite to their point of connection with flange 44, receive a second race member 52, having an outside diameter appreciably less than the inside diameter of body 10 and disposed between the plug 12 and the race member 38 within body 10. This member 52 is provided with a race 54 that circumscribes the shaft 20 and receives a plurality of rotatable elements 56 in the nature of spheres, as illustrated, there being three of these members 56 within race 54 as shown by Fig. 3 of the drawing.

This race member 52 is supported by the stubs 48, there being openings 58 provided in the race member 52 for receiving reduced ends of the stubs 48. The race member 52, also, has a bore 60 formed therein appreciably larger than any part of the shaft 20 for circumscribing and clearing the latter.

The innermost face of the plug 12 is provided with a plurality of openings 62 having press fitted therein a like number of pins 64 that project inwardly into body 10 between the rotatable elements 56. Obviously, there are three of these pins 64 for separating the three elements 56, as clearly illustrated in Fig. 3 of the drawing. Pins 64 are disposed in circumscribing relationship about shaft 20 and so arranged as to permit free rotation of the race member 52 thereabout.

As clearly illustrated in Fig. 2 of the drawing, the shaft 20 terminates at its innermost end in spaced relationship to the plug 14 and projects into the bushing 32 for free rotation therein. The shaft 20 is provided with a boss 66 intermediate its ends and, more specifically, between the two sets of rotatable elements 42 and 56. This boss 66 constitutes an enlarged portion or a portion of greater diameter on shaft 20 and merges with the lengths of lesser diameter of shaft 20 through bevelled portions 68 and 70, respectively.

Assuming all parts of the device to be formed and arranged as above set forth, the operation is as follows:

Remembering that body 10 is freely reciprocable relative to the shaft 20, through the sliding connection between shaft 20 and bushing 18, as well as between the innermost end of the shaft 20 and bushing 32, such relative movement of body 10 in one direction will move elements 42 into frictional engagement with bevelled portions 70 of shaft 20, and relative movement of body 10 in the opposite direction will move elements 56 into frictional engagement with the bevelled portions 68 of shaft 20.

Fig. 1 of the drawings shows one way of mounting the device through use of a clamp 72 in circumscribing engagement with body 10. Clamp 72 has a pair of opposed fingers 74 loosely embracing post 76 of drill press 23.

Assuming first that drill press 23 is manipulated to move tap 38 into engagement with work 78 on table 80, clamp 72 will move with body 10 while preventing rotation thereof. Bevelled portion 70 of shaft 20 will move into frictional engagement with elements 42, whereupon rotation of shaft 20 in one direction will cause elements 42 to move therewith, since body 10 is being held against rotation. Such movement of the elements 42 as a unit will rotate the member 30 in the same direction as the rotation of shaft 20 because of the engagement of elements 42 with the stubs 48.

Consequently, shaft 20, elements 42, stubs 48, flange 44, rotatable member 30 and shaft 34 will all rotate in the same direction as a unit as body 10, race member 38 and plug 14 are held against rotation. It is to be remembered that the tubular member 30 rotates within the opening 28 of plug 14.

Obviously, rotation of the stubs 48 will, also, cause rotation of the race member 52 but, during this phase of the operation, such rotation of race member 52 is only consequential and has no effect, since elements 56 are held in a given position with respect to body 10 by virtue of the pins 64.

To rotate the chuck 36 and tool 38 carried thereby in the opposite direction to that just described, while shaft 20 rotates in the same direction as that above assumed when elements 42 are in engagement with bevelled portion 70, body 10 must be reciprocated in a direction away from chuck 22. Such movement of body 10 with respect to shaft 20 moves frictional elements 42 out of engagement with the bevelled portion 70 of shaft 20 and is accomplished by operation of press 23 to raise chuck 22.

As the chuck 22 is continued to be moved in a direction away from body 10, the elements 56 are brought into frictional engagement with the bevelled portion 68 of shaft 20. Fig. 2 shows the way in which plug 12 cooperates with the race 54 and shaft 20 in holding elements 56 in a circular path about shaft 20 and against the bevelled portion 68.

Here again, the body 10 is held against rotation with respect to the shaft 20 and, accordingly, as shaft 20 rotated to rotate elements 56 in the opposite direction, such elements cannot revolve as a unit about shaft 20 because of the inwardly-extending pins 64. However, since the elements 56 are rotating in a direction opposite to the rotation of shaft 20 and upon their own vertical axes, such elements 56 will cause rotation of the race member 52 in the opposite direction of rotation to that of shaft 20.

Consequently, the chuck 36 and tool 38 will rotate in a direction opposite to shaft 20 by virtue of the connection between rotatable member 30 and the race member 52 through the stubs 48 joining flange 44 and race member 52.

With the body 10 and the parts carried thereby positioned so as to maintain elements 56 and 42 out of engagement with bevelled portions 68 and 70, respectively, there will be no rotation of the chuck 36 or tool 38 if even a small load is upon the tool 38. By the same token, tool 38 is not rotated by shaft 20 when the body 10 is permitted to rotate with shaft 20 by virtue of the frictional engagement of body 10 with shaft 20.

Through actual use of the device above set forth, it has been determined that only a relatively light touch need be imparted by the operator to the body 10 when bracket 72 is not used to hold body 10 against rotation and to, also, hold body 10 in positions for bringing either elements 42 or elements 56 into engagement with respective bevelled portions of shaft 20. When such light touch is imparted to the body 10, there will be no breakage of the tool 38 while the shaft 20 rotates continuously in one direction because, the moment any binding or other obstruction takes place upon tool 38 tending to prevent its free rotation, the elements 42 or 56, as the case may be, will slip with respect to shaft 20.

It has been determined, also, that the entire tapping operation can be speeded up tremendously through use of the driving connection hereof, since the operator can quickly and easily change the directions of rotation of tool 38 by the mere manipulation of drill press 23. In other words, reciprocation of shaft 20 in one direction with respect to body 10 will cause rotation of tap 38 to form threads in the work being handled and, as soon as such operation is completed, the tap 38 may be removed from the work by shifting shaft 20 in the opposite direction within body 10 and thereby rotating tool 38 in the opposite direction.

Clearly, if the device is to be used in a drill press, the operator will cause movement of chuck 22 and shaft 20 carried thereby toward and from the work 78 as above set forth.

It has, also, become apparent from the foregoing that the driving connection hereof serves as a speed reducer between shafts 20 and 34. The proportion of speed reduction, of course, is dependent upon the extent of frictional engagement between driving elements 42 and 56 and shaft 20 and, accordingly, the extent of speed reduction is not positive.

While the driving elements 42 and 56 have been illustrated as spherical members and, while the races 40 and 54 therefor have been formed to accommodate such shaped driving elements, it is apparent that a very effective speed reducer might be produced by varying the shapes of elements 42, 56, 40 and 54. Obviously, through use of frusto conical, rotatable elements in lieu of spheres 42 and 56, together with correspondingly-shaped races, a more positive drive could be provided for either speed reduction or increase.

By the same token, such members might well be made to present a number of flat faces and having a hexagonal cross sectional contour, if desired.

Therefore, while but one embodiment of the present invention has been illustrated and described, the same is inherently capable of many modifications and changes in details of construction, and such alterations as fairly come within the scope of the appended claims are contemplated hereby.

Having thus described our invention, what we claim as new and desire to secure by Letters Patent is:

1. A driving assembly comprising a first rotatable shaft; a second rotatable shaft coaxially aligned with said first shaft; a pair of races, each having a series of rotatable elements circumscribing the axes of said shafts; structure joining one race with the second shaft and disposed within an annular path of travel of the series of elements of the other race about said axes; means for holding the series of elements of said one race against movement in an annular path about said axes; means for holding said other race against rotation; means for holding said other race against movement toward and away from the second shaft; and means on the first shaft between the races for alternately engaging said series of elements as the first shaft is reciprocated relatively thereto on its axis whereby to selectively rotate the second shaft in opposite directions.

2. A driving assembly comprising a first rotatable shaft; a second rotatable shaft coaxially aligned with said first shaft; a body circumscribing the shafts adjacent their proximal ends and rotatable relative thereto, said body and said first shaft being relatively reciprocable on the axes of said shafts; a first race rotatable in the body; a second race rigid in the body; structure joining said first race and said second shaft for rotation as a unit; a first series of rotatable elements circumscribing said axes within the first race; a second series of rotatable elements circumscribing said axes within the second race; means in the body for holding said first series of elements against movement in an annular path with respect to the body, said structure being within an annular path of travel of said second series of elements; and means on the first shaft, alternately engageable with said first and said second series of elements as the first shaft and the body are reciprocated relatively, for rotating the second shaft in opposite directions.

3. A driving assembly comprising a first rotatable shaft; a second rotatable shaft coaxially aligned with said first shaft; a body circumscribing the shafts adjacent their proximal ends and rotatable relative thereto, said body and said first shaft being relatively reciprocable on the axes of said shaft; a first race rotatable in the body; a second race rigid in the body; structure joining said first race and said second shaft for rotation as a unit; a first series of rotatable elements circumscribing said axes within the first race; a second series of rotatable elements circumscribing said axes within the second race; means in the body for holding said first series of elements against movement in an annular path with respect to the body, said structure being within an annular path of travel of said second series of elements; and means on the first shaft, alternately engageable with said first and said second series of elements as the first shaft and the body are reciprocated relatively, for rotating the second shaft in opposite directions, said second race circumscribing a portion of said structure.

4. A driving assembly comprising a first rotatable shaft; a second rotatable shaft coaxially aligned with said shaft; a body circumscribing the shafts adjacent their proximal ends and rotatable relative thereto, said body and said first shaft being relatively reciprocable on the axes of said shafts; a first race rotatable in the body; a second race rigid in the body; structure joining said first race and said second shaft for rotation as a unit; a first series of rotatable elements circumscribing said axes within the first race; a second series of rotatable elements circumscribing said axes within the second race; means in the body for holding said first series of elements against movement in an annular path with respect to the body, said structure being within an annular path of travel of said second series of elements; and means on the first shaft, alternately engageable with said first and said second series of elements as the first shaft and the body are reciprocated relatively, for rotating the second shaft in opposite directions, said means on the first shaft comprising a boss having opposed, annular, inclined surfaces.

5. A driving assembly comprising a first rotatable shaft; a second rotatable shaft coaxially aligned with said first shaft; a body circumscribing the shafts adjacent their proximal ends and rotatable relative thereto, said body and said first shaft being relatively reciprocable on the axes of said shafts; a first race rotatable in the body; a second race rigid in the body; structure joining said first race and said second shaft for rotation as a unit; a first series of rotatable elements circumscribing said axes within the first race; a second series of rotatable elements circumscribing said axes within the second race; means in the body for holding said first series of elements against movement in an annular path with respect to the body, said structure being within an annular path of travel of said second series of elements; and means on the first shaft, alternately engageable with said first and said second series of elements as the first shaft and the body are reciprocated relatively, for rotating the second shaft in opposite directions, said second race circumscribing a portion of said structure, said structure comprising a number of pins on the first race and an out-turned flange on the second shaft for receiving the pins.

EARL M. KURTZ.
JOSEPH B. HOUSTON.

REFERENCES CITED

The following references are of record in the file of this patent:

UNITED STATES PATENTS

| Number | Name | Date |
|---|---|---|
| 597,311 | Busch | Jan. 11, 1898 |
| 1,399,442 | Rennerfelt | Dec. 6, 1921 |
| 1,995,171 | Coffee | Mar. 19, 1935 |
| 2,095,279 | Newman | Oct. 12, 1937 |

FOREIGN PATENTS

| Number | Country | Date |
|---|---|---|
| 794,188 | France | Dec. 2, 1935 |